United States Patent Office.

BENJAMIN PRYOR STOCKMAN, OF LONDON, ENGLAND, ASSIGNOR TO THE STOCKMAN IRON AND STEEL COMPANY, OF WEST VIRGINIA.

PROCESS OF PURIFYING IRON.

SPECIFICATION forming part of Letters Patent No. 594,497, dated November 30, 1897.

Application filed March 3, 1896. Serial No. 581,696. (No specimens.) Patented in England April 27, 1894, No. 8,370; in France April 4, 1895, No. 246,394; in Belgium April 23, 1895, No. 115,268; in Luxemburg April 26, 1895, No. 2,292; in Italy May 18, 1895, LXXVI, 42; in New Zealand June 7, 1895, No. 7,660; in Austria September 2, 1895, No. 45/3,039, and in Hungary October 26, 1895, No. 4,016.

*To all whom it may concern:*

Be it known that I, BENJAMIN PRYOR STOCKMAN, a citizen of England, residing at Grosvenor Mansions, Victoria Street, Westminster, London, England, have invented certain new and useful Improvements in the Manufacture of Iron, (for which I have obtained patents in the following countries, viz: Austria September 2, 1895, No. 3,039/45; Belgium April 23, 1895, No. 115,268; France April 4, 1895, No. 246,394; Great Britain April 27, 1894, No. 8,370; Hungary October 26, 1895, No. 4,016; Italy May 18, 1895, Vol. LXXVI, No. 42; Luxemburg April 26, 1895, No. 2,292, and New Zealand June 7, 1895, No. 7,660,) of which the following is a specification.

My invention has for its object the production of iron from crude iron by means of a mixture of nitrate of soda ($NaNO_3$) and magnetic iron-sand ($Fe_3O_4$) used in a converter, upon which mixture the iron in a molten state is suddenly poured, the process being a basic one and automatic.

The magnetic iron-sand (also known as "black" sand) is a granular magnetic iron ore abounding in New Zealand and found also in other countries. The nitrate of soda is used in the commercial pulverized form. Practically I find a good proportion to be about two hundred pounds of the nitrate of soda and eighty pounds of the magnetic iron-sand to a ton of iron treated.

As the apparatus employed for the process may be varied it is not necessary to describe any particular form.

The iron to be treated may be pig-iron melted in an ordinary cupola or may be the iron run direct from a blast-furnace. This in a molten condition is run into a gaging vessel to measure the proper quantity, which is then immediately discharged into the converter containing the mixture of nitrate of soda and iron-sand. The oxygen liberated from the nitrate of soda and from the iron-sand attacks impurities and combines with metalloids in the iron, separating them in the form of slag. The iron-sand being deoxidized its iron mixes with the converted iron and aids to render the whole product homogeneous. The iron-sand, owing to its great specific gravity and uniform sand-like grain, acts also mechanically as a diluent for the nitrate of soda by separating its particles and thus preventing its deflagrating or explosive action.

The whole refining process occupies only a few minutes and is quite noiseless.

By this process I can convert phosphoric pig-iron—such, for example, as that known in England as "Cleveland" pig.

The proportions of the ingredients may be somewhat varied according to the nature of the iron to be dealt with, and small quantities of other ingredients—such as black oxid of manganese, lime, and sodium chlorid—may be added.

The converted iron may be dealt with by a short puddling process, or while fluid it may be placed in a reverberatory furnace, where it can be refined and operated upon to form ingot-iron, mild steel, or harder steel. In this refining operation I use the iron-sand in the fettle of the furnace for decarburizing, also along with carbon for steel-making.

Having thus described the nature of this invention and the best means I know of carrying the same into practical effect, I claim—

1. The herein-described process of converting phosphoric or other iron from its crude state into malleable iron which consists in subjecting such iron in a molten state to the action of a loose granular mixture of nitrate of soda in a dry powdered state and magnetic iron-sand.

2. The herein-described compound to be used in the conversion of molten phosphoric or other pig-iron into malleable iron which consists of a loose granular combination of dry powdered nitrate of soda and magnetic iron-sand mixed together in proportions suitable to the quantity of molten metal to be converted.

In testimony whereof I have signed my name to this specification, in the presence of two subscribing witnesses, this 21st day of February, A. D. 1896.

BENJAMIN PRYOR STOCKMAN.

Witnesses:
 OLIVER IMRAY,
 JNO. P. M. MILLARD.